United States Patent [19]

Eckhardt et al.

[11] Patent Number: 5,599,619

[45] Date of Patent: Feb. 4, 1997

[54] WRITE ONCE MAGNETO-OPTIC MEDIA AND SYSTEM

[75] Inventors: John G. Eckhardt, Morgan Hill; Michael M. Farrow, Saratoga; Chien-Jung F. Lin, San Jose; James C. Suits, Los Gatos, all of Calif.

[73] Assignee: International Business Machines Corporation, Armonk, N.Y.

[21] Appl. No.: 779,220

[22] Filed: Oct. 18, 1991

[51] Int. Cl.$^6$ .................. G11B 5/66; B32B 5/16
[52] U.S. Cl. .............. 428/332; 428/336; 428/694 ML; 428/694 EC; 428/694 SC; 428/694 RE; 428/694 DE; 428/694 XS; 428/900; 369/13; 365/122
[58] Field of Search .............. 428/694 ML, 694 EC, 428/694 SC, 694 MM, 694 RE, 694 DE, 694 XS, 332, 336, 900; 369/13; 365/122

[56] References Cited

U.S. PATENT DOCUMENTS

| | | | |
|---|---|---|---|
| 4,467,383 | 8/1984 | Ohta et al. | 360/131 |
| 4,855,975 | 8/1989 | Akasaka et al. | 369/13 |

FOREIGN PATENT DOCUMENTS

| | | |
|---|---|---|
| 258978 | 3/1988 | European Pat. Off. . |
| 333462 | 9/1989 | European Pat. Off. ........ G11B 11/10 |
| 893135913 | 12/1989 | European Pat. Off. ........ G11B 11/10 |
| 903022135 | 1/1990 | European Pat. Off. ........ G11B 11/10 |
| 382859 | 8/1990 | European Pat. Off. ........ G11B 11/10 |
| 465859 | 1/1992 | European Pat. Off. ........ G11B 11/10 |
| 63-237242 | 10/1988 | Japan ........ G11B 11/10 |
| 01128246 | 5/1989 | Japan ........ G11B 11/10 |
| 01237946 | 9/1989 | Japan ........ G11B 11/10 |

OTHER PUBLICATIONS

J. Saito, et al., Direct Overwrite by Light Power Modulation on Magneto-Optical Multi-Layered Media, Japanese Journal of Applied Physics, vol. 26, 1987, Supplement 26-4.

Primary Examiner—Leszek Kiliman
Attorney, Agent, or Firm—Douglas R. Millett; Noreen A. Krall

[57] ABSTRACT

An optical data storage medium is comprised of a data layer and a reference layer deposited onto a substrate. The data layer material is comprised of a transition metal rich rare earth-transition metal. The data layer has a destruction temperature greater than its Curie temperature. The reference layer is comprised of a transition metal poor rare earth-transition metal. The reference layer material has a Curie temperature greater than the destruction temperature of the data layer material. The result is a magneto-optic medium which may be recorded upon only once.

20 Claims, 4 Drawing Sheets

WRITE ONCE MAGNETO-OPTIC MEDIA AND SYSTEM

BACKGROUND OF THE INVENTION

1. Field of the Invention

This invention relates generally to optical data storage media and systems and more particularly to a write once magneto-optic media and system.

2. Description of the Prior Art

Optical data storage systems store large quantities of data on a single optical disk medium. Write once read many (WORM) and erasable magneto-optic (MO) are two types of optical systems.

WORM systems are used to permanently record data. Specific applications include storing the financial data of financial institutions and claim documentation of insurance companies. The WORM systems typically use a media upon which data is permanently recorded by burning pits into the media or changing the phase of spots on the media with a laser beam at relatively high power. The data is then read by directing a low power laser beam at the media. The data pits or spots have different reflectivity than the surrounding media and this difference in reflectivity is detected by the optical channel and converted into a digital signal representative of the recorded data.

MO systems allow data to be written and erased repeatedly from the same media. The systems use a media which contains rare earth-transition metal compositions. Initially, the media has its magnetic domain oriented in a first direction. Data is recorded by directing a high power laser beam to a spot on the media in order to heat the media above its Curie temperature. At approximately this temperature, the media has negligible magnetic coercivity and its magnetic domain is easily oriented in a second direction by a small biasing electro-magnet in the disk drive. When the material cools below its Curie temperature it retains its magnetic orientation. The data is then read by directing a low power polarized laser beam at the media. The different magnetic domain orientations cause the laser beam's plane of polarization to be rotated one way or the other upon reflecting from the media. This is known as the Kerr effect. This difference in polarization is detected by the optical channel and a data signal representative of the recorded data is generated.

The MO media may be erased by re-heating the media to above its Curie temperature with the laser and then reversing the magnetic domain with the small biasing magnet. A disadvantage of the scheme is that the media must be rotated one complete revolution to erase a track on the media before re-writing may begin. Various schemes to directly overwrite (DOW) the MO media had been proposed. These include Saito, et al. "Direct Overwrite By Light Power Modulation On Magneto-Optical Multi-Layered Media," Japanese Journal of Applied Physics, Vol. 26 (1987), supplement 26-4; European Patent Application 89313591.3, filed Dec. 27, 1989 by Shiratori; European Patent Application 90302213.5, filed Jan. 3, 1990, by Matsumoto; Japanese application 01-128246, filed May 19, 1989 by Yumoto, et al.; Japanese application 63-237242, filed Oct. 3, 1988 by Kobayashi, et al.; and Japanese application 01-237946, filed Sep. 22, 1989 by Inoue, et al.

Optical disk drive users need the flexibility of being able to use both WORM and erasable MO media as their applications dictate. However, the standard WORM media are not compatible with standard MO drives and visa versa. It is desirable to build a single drive which can handle both WORM and MO. However, with the present WORM media such a drive would have to be able to do both reflectivity and polarization detection. This would necessitate two different optical channels and some way for the drive to identify which media it is using and switch between the channels. The result is a complex drive which is not optimized for either MO or WORM.

SUMMARY OF THE INVENTION

In accordance with the present invention, a write once MO medium is provided which can be used in MO drives. The medium comprises a data layer and a reference layer deposited on a substrate. The data layer and the reference layer are strongly exchange coupled. The data layer is preferably a rare earth-transition metal composition which is transition metal (TM) rich. The reference layer is preferably a rare earth-transition metal composition which is TM poor. The medium is exposed to a large magnetic field during manufacture and a high energy domain wall is formed between the data layer and the reference layer.

The medium is then used in a MO drive. Data is permanently recorded onto the medium by directing a high power laser to the medium. The laser heats the spots on the medium to above the Curie temperature of the data layer, and upon cooling, the magnetization of the data layer reverses itself in order to eliminate the domain wall. The reference layer has a Curie temperature approximately equal to or greater than the temperature at which the data layer is irreversibly damaged. The result is that the reference layer may not be altered and the data on the data layer may not be erased. This WORM MO medium is read by detecting changes in polarization, as is the case with standard MO medium and may therefore be used in standard MO drives.

For a fuller understanding of the nature and advantages of the present invention reference should be made to the following detailed description taken into conjunction with the accompanying drawings.

DESCRIPTION OF THE PREFERRED EMBODIMENT

Figure 1:
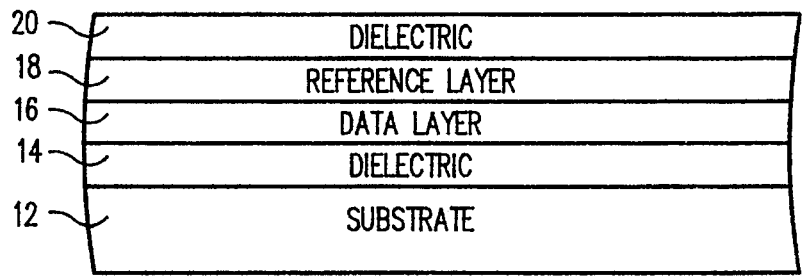
FIG. 1 is a cross sectional view of the medium of the present invention.

FIG. 1 shows a cross sectional view of an optical medium of the present invention and is designated by the general reference number 10. Medium 10 comprises an optical substrate 12 which may be made of glass or polycarbonate in the preferred embodiment. A dielectric layer 14 is deposited onto substrate 12. Dielectric layer 14 may be made of optical dielectrics as are known in the art, such as $Si_3N_4$ $Al_2O_3$ or AlN.

A data layer 16 is deposited onto dielectric layer 14. Data layer 16 is preferably a rare earth-transition metal. The data layer material has a Curie temperature which is typically 130°–300° C. Above temperatures of approximately 400° C. the data layer 16 will be irreversibly damaged. The data layer will no longer be able to record data nor will the drive be able to read data from the data layer. This critical temperature is known as the destruction temperature. The material of data layer 16 should also preferably have a compensation temperature which is below ambient temperature. Ambient temperature is the temperature at which the optical drive is operated and is typically in the range 0°–50° C.

One example of a material which may be used for the data layer 16 is $Tb_xFe_yCo_z$ where $19 \leq x \leq 22$, $66 \leq y \leq 81$, $0 \leq z \leq 12$, and $x+y+z=100$. This material is also known as a rare earth-transition metal which is transition metal rich. Rare earth-transition metal compositions contain both a rare earth subnetwork and a transition metal subnetwork. The magnetizations of the two subnetworks are in opposite directions. The direction of the net magnetization of the rare earth-transition metal will therefore depend upon which subnetwork predominates. If the net magnetization is in the same direction as the transition metal subnetwork, then the composition is defined as transition metal rich. If the net magnetization is in the opposite direction to the transition metal subnetwork magnetization, then the composition is transition metal poor. For the data layer 16 the net magnetization is in the same direction as the TM subnetwork's magnetization for temperatures above its compensation temperature.

A reference layer 18 is deposited onto layer 16. Reference layer 18 is preferably a rare earth-transition metal having a Curie temperature which is approximately equal to or greater than the destruction temperature of the data layer. In other words, it is not possible to change the direction of magnetization of the reference layer 18 by heating without destroying the data layer 16. Preferably, reference layer 18 has a compensation temperature which is within a range of ±50° C. of the data layer's Curie temperature. The reference layer 18, preferably has a Curie temperature of approximately 450°–500° C. One example of a material which may be used for the reference layer 18 is $Tb_aFe_bCo_c$ where $26 \leq a \leq 29$, $0 \leq b \leq 51$, $22 \leq c \leq 74$, and $a+b+c=100$. This material is a rare earth-transition metal which is transition metal poor. The net magnetization of the material is in the opposite direction to the transition metal subnetwork's magnetization. In this case, the net magnetization of the reference layer 18 is in the same direction as the rare earth subnetwork's magnetization.

A second dielectric layer 20 is deposited on the reference layer 18. Dielectric layer 20 is preferably made of the same material as dielectric layer 14. The dielectric layer 20 acts as a protective covering. Alternatively another type of protective material may be substituted for dielectric layer 20. In the preferred embodiment, the substrate 12 is 1.2 mm thick, dielectric 14 layer is 100–1000 Å thick, data layer 16 is 400–800 Å thick, reference layer 18 is 600–3000 Å thick, and dielectric layer 20 is 200–2000 Å thick. The layers may be deposited using standard deposition techniques such as sputtering.

Figure 2:
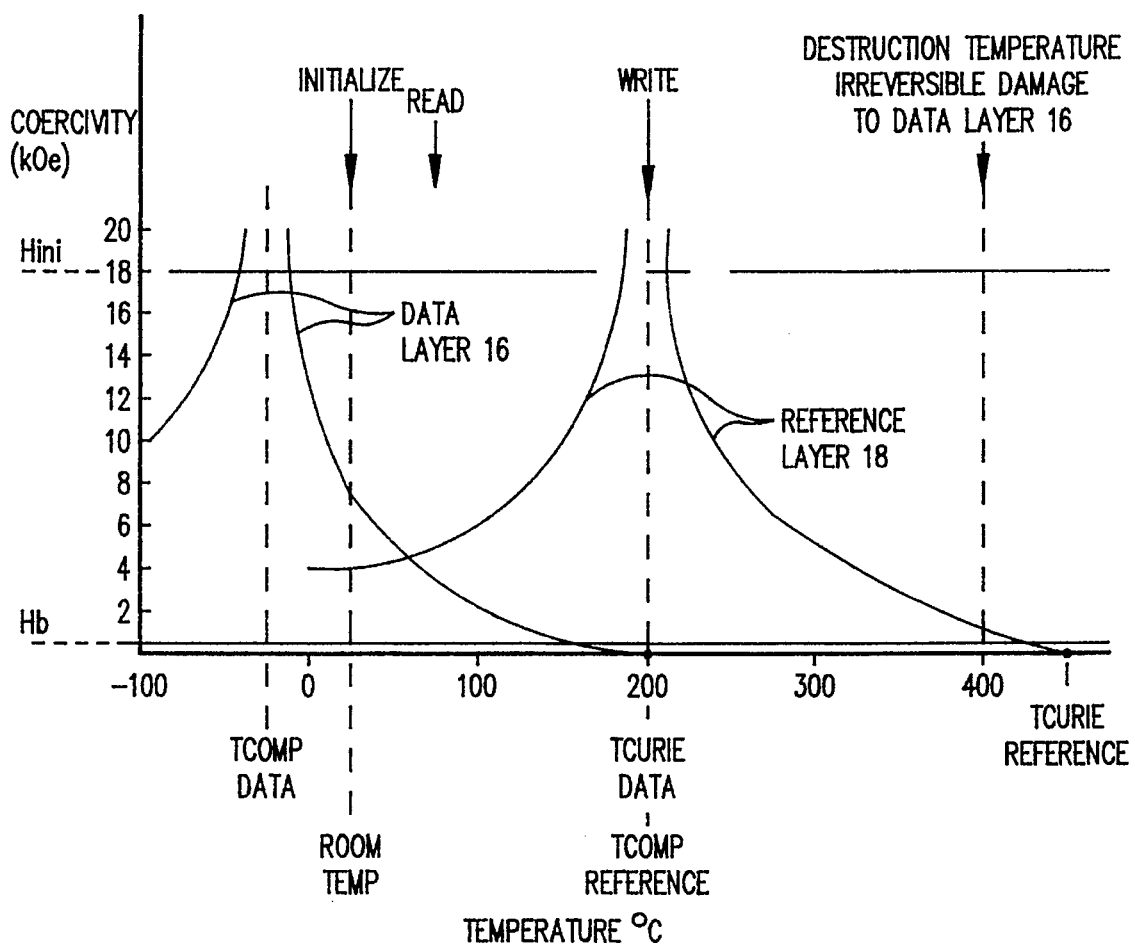
FIG. 2 is a graph of coercivity versus temperature for the medium of the present invention.

FIG. 2 is a graph of coercivity versus temperature for the data layer 16 and the reference layer 18. Note that the Curie temperature of the reference layer 18 is greater than the destruction temperature of the data layer 16.

Figure 3:
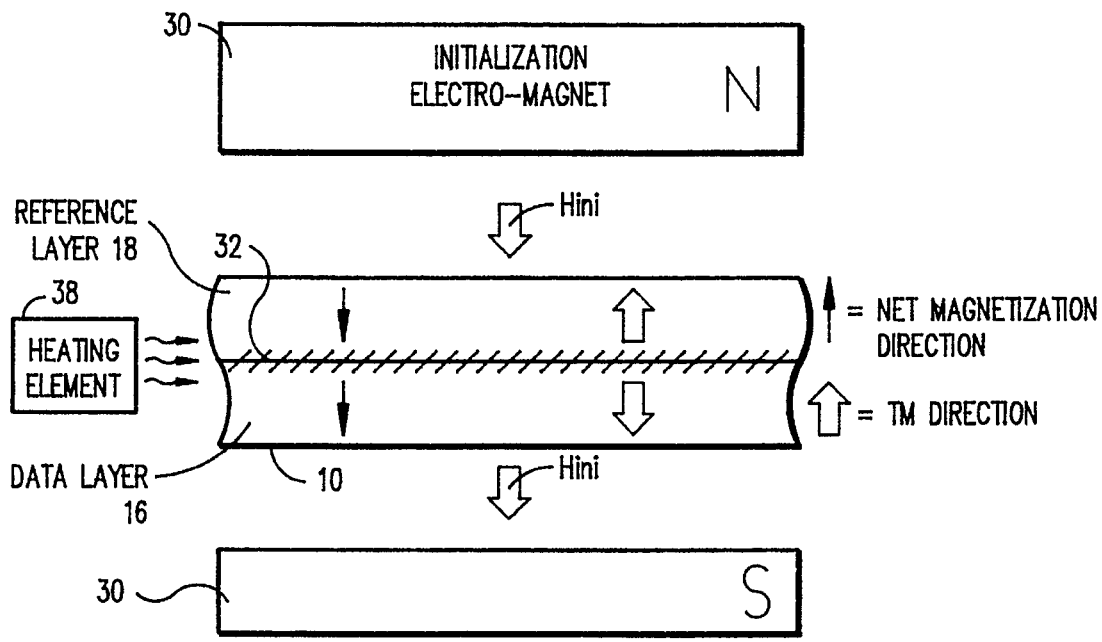
FIG. 3 is a schematic diagram of the initialization process of the present invention.

FIG. 3 shows a schematic diagram of the initialization process of the present invention. Only the data layer 16 and reference layer 18 of medium 10 have been shown for purposes of illustration. Medium 10 is placed in a large initialization electromagnet 30 at room temperature. Magnet 30 generates a large magnetic field Hini which covers medium 10. The field Hini is sufficiently strong to cause the net magnetization of both the data layer 16 and reference layer 18 to line up along the same direction. The thin arrows of FIG. 3 represent the net magnetization direction of each layer. When this occurs, the data layer 16 will have its TM subnetwork's magnetic orientation aligned in the opposite direction to the magnetic orientation of the TM subnetwork of the TM poor reference layer 18. At the interface 32, between the two layers, a high energy domain wall is formed. See the slashed line of FIG. 3. The domain wall 32 occurs because the magnetic dipoles of the two TM subnetworks of the two layers are in opposite directions. Energy is stored in the domain wall. The magnetic orientation will remain as initialized until the data layer is heated to a temperature approximately equal to or greater than its Curie temperature. It should be noted in FIG. 3 that the magnetization of the rare earth subnetworks of each layer are in the opposite direction to that shown for the transition metal subnetworks.

The initialization magnet 30 must be of sufficiently large strength to align the layers properly.

$$Hini > Hc(data) + \sigma/(2*M*t)$$

Where Hc(data) is the coercive force of the data layer, σ is the domain wall energy density, M is the magnetization strength of the data layer 16 and t is the thickness of the data layer. The above values are calculated at the initialization temperature. In the preferred embodiment, initialization is done at ambient temperature and the Hini is equal to approximately 18 KOe.

The material of data layer 16 is preferably chosen to have a compensation temperature less than room temperature in order to allow the initialization process to be done at room temperature. See FIG. 2. However, the material for data layer 16 may alternatively have a compensation temperature equal to or greater than ambient temperature. The Curie temperature of the data layer 16 must still, of course, be less than the destruction temperature. In the case of this alternative material, the initialization process is done at temperatures above the compensation temperature of the data layer (greater than ambient in this case). This is achieved by heating the media while it is in the initialization magnet 30. FIG. 3 shows an optional heating element 38 which is placed proximate the medium 10.

Figure 4:
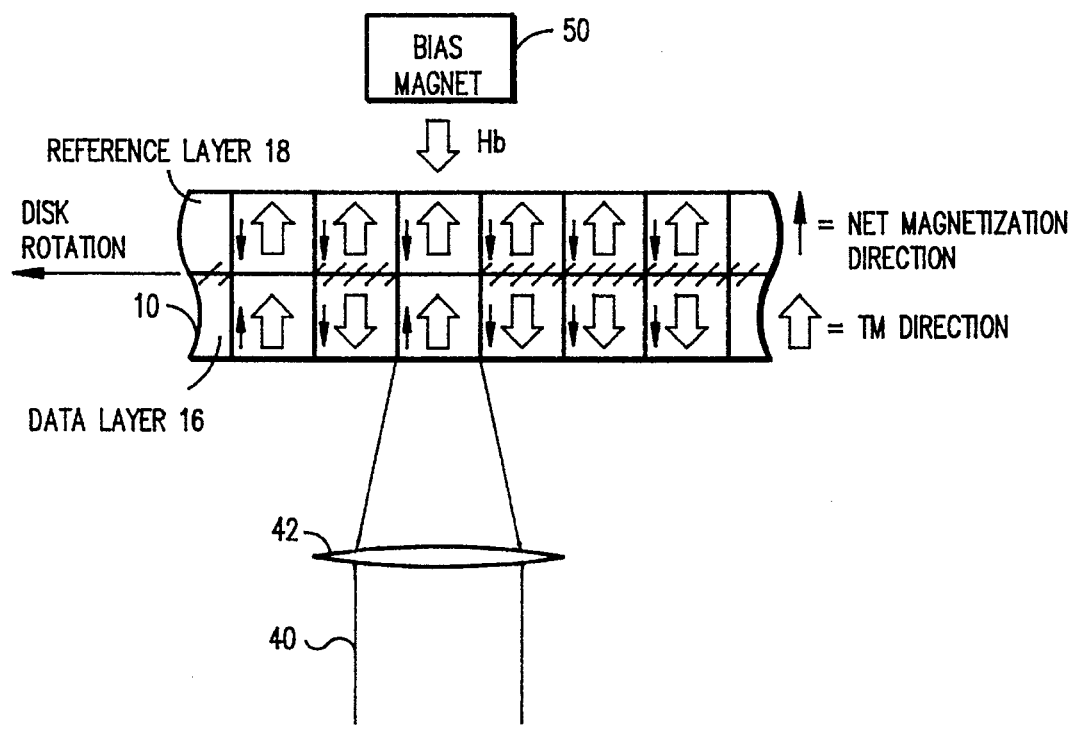
FIG. 4 is a schematic diagram of the writing process of the present invention.

FIG. 4 shows a schematic diagram of the writing process of the present invention. The medium 10 which has previously been initialized, is placed in a magneto-optic disk drive. The polarized laser beam 40 is focussed by a lens 42 onto a spot on the data layer 16. The power of beam 40 is set such that the temperature of the spot is approximately equal to or greater than the Curie temperature of the data layer 16. When this occurs the transition metal subnetwork of the data layer 16 reverses its orientation and aligns with the transition metal subnetwork of the reference layer. The domain wall is thereby eliminated.

The data spot on the data layer 16 is now permanently recorded. The bias magnet 50 which is contained in the typical MO drive generates a relatively small magnetic field (typically ≦500 Oe) which is unable to reorient the data layer. Attempting to rewrite the disk by using the laser to heat the medium above the reference layer's Curie temperature is also ineffective. This temperature exceeds the destruction temperature of the data layer and the media will be permanently damaged. It is therefore not possible to selectively overwrite the data recorded. The disk may be completely erased in its entirety only by repeating the initialization process described above.

The medium 10 is typically in a disk shape and is rotated in a direction relative to beam 40 as indicated by the arrow. The laser beam 40 is pulsed on or off such that the data is recorded on the disk as spots on the data layer 16 having different net magnetization directions. The data is read by focussing a low power laser beam onto the disk. The Kerr effect causes the reflected light to have its plane of polarization to be rotated one way or the other and this difference in polarization is detected and converted to a digital data signal.

Figure 5:
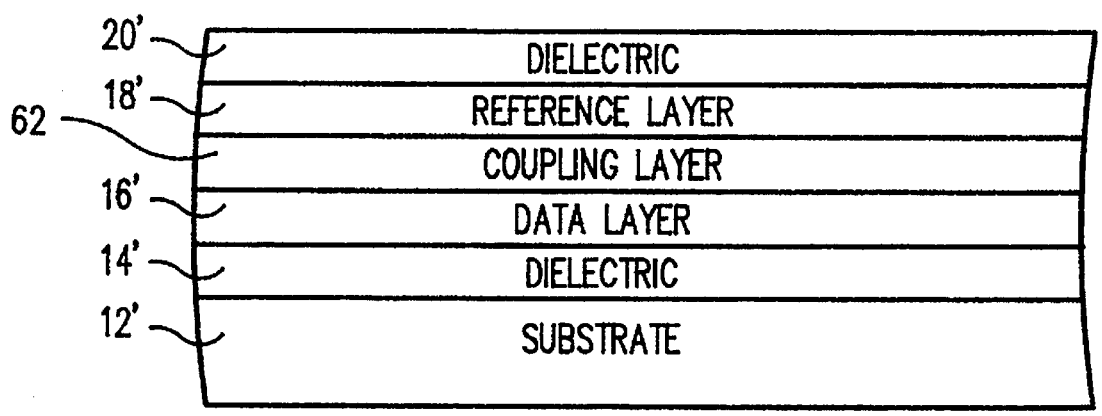
FIG. 5 is a cross sectional view of an alternative embodiment of the present invention.

FIG. 5 shows a cross sectional view of an alternative embodiment of the present invention and is designated by the general reference number 60. Elements of medium 60 which are similar to medium 10 are designated by a prime number. A coupling layer 62 has been added between data layer 16' and reference layer 18'. The coupling layer 62 may be used to obtain appropriate coupling strength between certain combinations of data and reference layers. Preferably coupling layer 62 is made of a rare earth-transition metal containing gadolinium or dysprosium. The thickness of layer 62 is preferably 50–200 Å.

Figure 6:
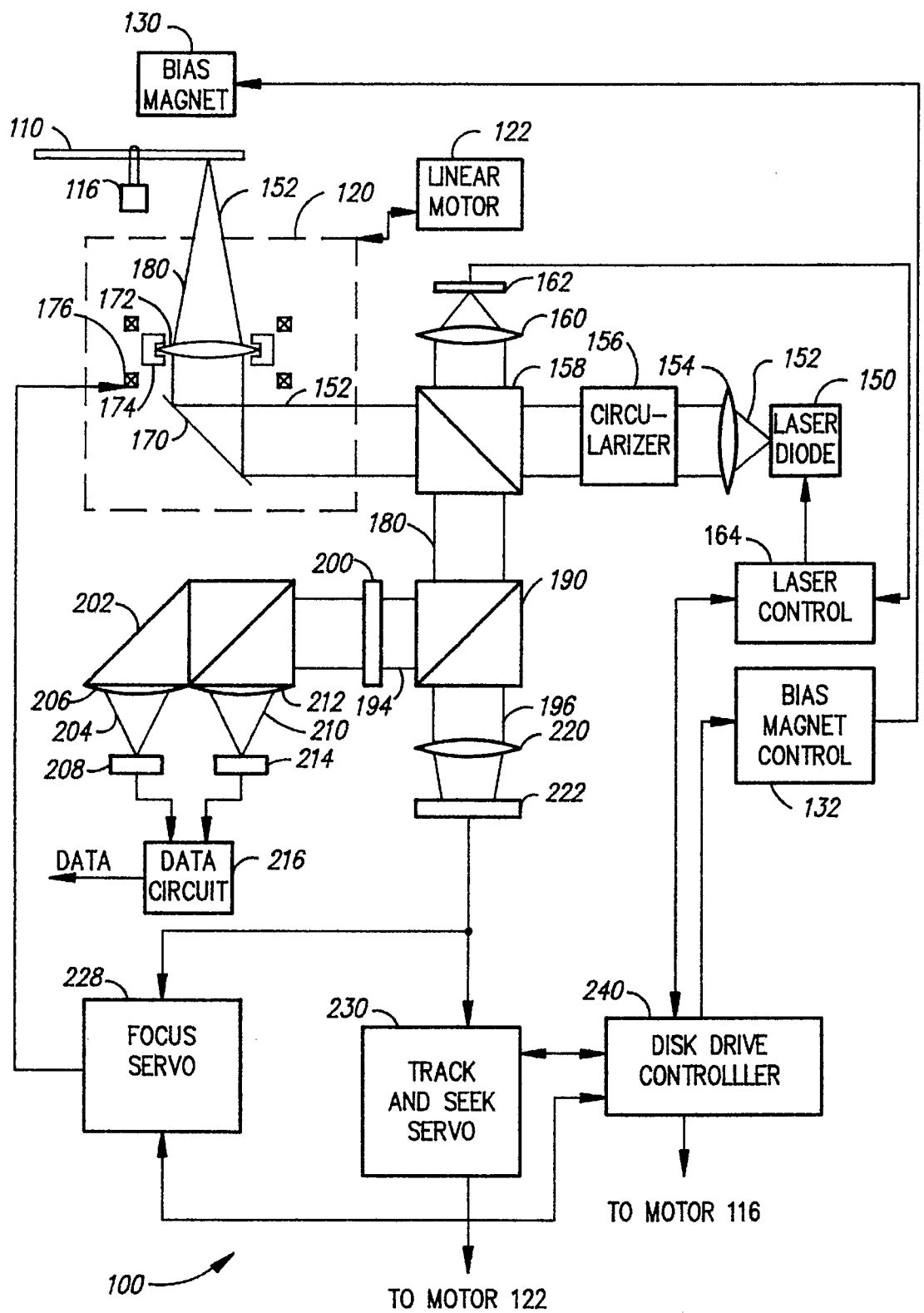
FIG. 6 is a schematic diagram of an optical disk drive system of the present invention.

FIG. 6 is a schematic diagram of an optical data storage system of the present invention and is designated by the general reference number 100. System 100 may be used with standard MO media as well as the medium 10 or 60 of the present invention. System 100 has a disk medium 110 which represents a standard MO medium as well as medium 10 or 60 of the present invention. Medium 110 is mounted to a spindle motor 116. An optical head 120 is positioned below medium 110. Head 120 is moved in a radial direction relative to disk 110 by a linear motor 122. A bias magnet 130 is located above medium 110 and is connected to a magnet control 132.

A laser 150 produces a polarized light beam 152. Laser 150 is preferably a gallium-aluminum-arsenide laser diode which generates light at approximately 780 nm in wavelength. Light beam 152 is collimated by a lens 154 and circularized by a circularizer 156. Circularizer 156 is preferably a prism.

Beam 152 passes to a beamsplitter 158. A portion of beam 152 is reflected toward a lens 160. Lens 160 focuses the light to a power monitor optical detector 162. Detector 162 is connected to a laser control 164. Detector 162 provides laser control 164 with a power monitor signal which is used to adjust the power of laser 150 as appropriate.

The remaining portion of beam 152 passes through beamsplitter 158 to a mirror 170. Mirror 170 reflects the light toward a focussing lens 172. Lens 172 focuses beam 152 onto the disk 110. Lens 172 is mounted in a lens holder 174. Holder 174 may be moved relative to disk 110 by an actuator motor 176. Mirror 170, lens 172, holder 174 and motor 176 are preferably located in the optical head 120.

A light beam 180 is reflected from the disk 110, passes through lens 172 and is reflected by mirror 170. A portion of the light beam 180 is then reflected by beamsplitter 158 to a beamsplitter 190. Beamsplitter 190 divides the beam 180 into a data beam 194 and a servo beam 196.

Data beam 194 passes through a quarterwave plate 200 to a polarizing beamsplitter 202. Beamsplitter 202 divides beam 194 into two orthogonal polarization components. A first polarization component beam 204 is focused by a lens 206 to a data detector 208. A second polarization component 210 is focussed by a lens 212 to a data optical detector 214. A data circuit 216 is connected to detectors 208 and 214 and generates a data signal representative of the data recorded on medium 110.

Servo beam 196 is focussed by a lens 220 onto a segmented optical detector 222, such as a spot size measuring detector as is known in the art. A focus servo 228, as is known in the art, is connected to detector 222 and motor 176. Servo 228 controls motor 176 to adjust the position of lens 172 as appropriate in order to maintain proper focus. A track and seek servo 230, as known in the art, is connected to detector 222 and motor 122. Servo 230 causes motor 122 to adjust the position of head 120 as appropriate. A disk drive controller 240, as is known in the art, provides overall control for servo 228 and 230, as well as spindle motor 116, laser control 164 and magnet control 132.

The operation of system 100 may now be understood. When it is desired to use drive 100 with a standard erasable MO medium of the prior art, the MO medium is used as medium 110. During the write operation, controller 240 causes laser control 164 to energize laser 150 to provide a high power polarized beam 152. Beam 152 is powerful enough to heat the medium 110 to above the Curie temperature. At the same time, controller 240 causes magnet control 132 to energize magnet 130. The laser 150 is pulsed responsive to the data to be recorded on the disk and this data is recorded on the disk as the changes in magnetic domain orientations.

During a read operation, controller 240 causes laser control 164 to energize laser 150 to generate a low power polarized beam 152. Beam 152 hits medium 110. The low power beam does not heat medium 110 to above its Curie temperature. The reflected light 180 has its plane of polarization rotated one way or the other depending upon the magnetic domain orientations of the spots on the medium 110. These differences in polarization are detected by detectors 208 and 214, and data circuit 216 outputs a digitized data signal representative of the recorded data.

When it is desired to use a WORM MO medium 10 or 60 of the present invention, such medium is used as medium 110. From the perspective of drive 100, the write operation is exactly the same for the WORM MO media as that described above with reference to the standard MO medium. From the perspective of the WORM MO medium 110, the write operation is the same as that described with reference to FIG. 4. The data layer is heated to above its Curie temperature and the domain wall is eliminated. The fact that the drive 100 is simultaneously energizing the small bias magnet 130 has no effect.

The read operation for the WORM MO medium 110 is the same as that described above with reference to the standard MO medium. From the perspective of the drive, there is no difference between the erasable MO medium and the WORM MO medium of the present invention. Both media have data recorded as differences in magnetic domain orientation. These differences are detected in the same way, as changes in polarization of the reflected beam and a data signal is generated.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A write once optical storage medium comprising:
   a substrate;

a data layer overlying the substrate, comprised of a first magnetic material having a first Curie temperature;

a reference layer overlying the data layer, comprised of a second magnetic material having a second Curie temperature greater than the first Curie temperature such that if the reference layer is heated to a temperature approximately equal to or greater than its Curie temperature the data layer can no longer be read.

2. The medium of claim 1, wherein a domain wall exists between the data layer and the reference layer.

3. The medium of claim 1, wherein the first magnetic material has a compensation temperature less than ambient temperature and the second magnetic material has a compensation temperature greater than ambient temperature.

4. The medium of claim 1, wherein the compensation temperature of the second magnetic material is within the range of ±50° C. of the Curie temperature of the first magnetic material.

5. The medium of claim 1, wherein, the reference layer is comprised of a rare earth-transition metal composition which is transition metal poor; and the data layer is comprised of a rare earth-transition metal composition which is transition metal rich.

6. The medium of claim 1, wherein, the reference layer is comprised of $Tb_aFe_bCo_c$, where $26 \leq a \leq 29$, $0 \leq b \leq 51$, $22 \leq c \leq 74$, and $a+b+c=100$; and the data layer is comprised of $Tb_xFe_yCo_z$, where $19 \leq x \leq 22$, $66 \leq y \leq 81$, $0 \leq z \leq 12$, and $x+y+z=100$.

7. The medium of claim 1, further including a coupling layer located between the data layer and the reference layer, comprised of a rare earth-transition metal composition containing an element selected from the group consisting of gadolinium or dysprosium.

8. The medium of claim 1, wherein the data layer has a net magnetic domain oriented in a first direction and a subnetwork magnetization oriented in the first direction, and the reference layer has a net magnetic domain oriented in the first direction and has a subnetwork magnetization oriented in a second direction opposite to the first direction.

9. The medium of claim 6, wherein the data layer is 400–800 Angstroms thick and the reference layer is 600–3,000 Angstroms thick.

10. The medium of claim 7, wherein the coupling layer is in the range of 50–200 Angstroms thick.

11. A write once optical storage medium comprising:

a substrate;

a dielectric layer overlying the substrate;

a data layer overlying the dielectric layer, comprised of a first magnetic material having a first Curie temperature;

a reference layer overlying the data layer, comprised of a second magnetic material having a second Curie temperature greater than the first Curie temperature, such that if the reference layer is heated to a temperature approximately equal to or greater than its Curie temperature, the data layer can no longer be read; and a sealing layer overlying the reference layer.

12. The medium of claim 11, wherein a domain wall exists between the data layer and the reference layer.

13. The medium of claim 11, wherein the first magnetic material has a compensation temperature less than ambient temperature and the second magnetic material has a compensation temperature greater than ambient temperature.

14. The medium of claim 11, wherein the compensation temperature of the second magnetic material is within the range of ±50° C. of the Curie temperature of the first magnetic material.

15. The medium of claim 11, wherein, the reference layer is comprised of a rare earth-transition metal composition which is transition metal poor; and the data layer is comprised of a rare earth-transition metal composition which is transition metal rich.

16. The medium of claim 11, wherein, the reference layer is comprised of $Tb_aFe_bCo_c$, where $26 \leq a \leq 29$, $0 \leq b \leq 51$, $22 \leq c \leq 74$, and $a+b+c=100$; and the data layer is comprised of $Tb_xFe_yCo_z$, where $19 \leq x \leq 22$, $66 \leq y \leq 81$, $0 \leq z \leq 12$, and $x+y+z=100$.

17. The medium of claim 11, further including a coupling layer located between the data layer and the reference layer, comprised of a rare earth-transition metal composition containing an element selected from the group consisting of gadolinium or dysprosium.

18. The medium of claim 11, wherein the data layer has a net magnetic domain oriented in a first direction and a subnetwork magnetization oriented in the first direction, and the reference layer has a net magnetic domain oriented in the first direction and has a subnetwork magnetization oriented in a second direction opposite to the first direction.

19. The medium of claim 16, wherein the data layer is 400–800 Angstroms thick and the reference layer is 600–3,000 Angstroms thick.

20. The medium of claim 7, wherein the coupling layer is in the range of 50–200 Angstroms thick.

* * * * *